(12) United States Patent
Mazerat et al.

(10) Patent No.: US 9,802,870 B2
(45) Date of Patent: Oct. 31, 2017

(54) METHOD OF TREATING CERAMIC FIBERS BY PHOSPHATING

(71) Applicants: HERAKLES, Le Haillan (FR); CENTRE NATIONAL DE LA RECHERCHE SCIENTIFIQUE, Paris (FR)

(72) Inventors: Stephane Mazerat, Louvroil (FR); Rene Pailler, Cestas (FR); Sylvie Loison, Saint Medard en Jalles (FR); Eric Philippe, Merignac (FR)

(73) Assignees: HERAKLES, Le Haillan (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 633 days.

(21) Appl. No.: 14/365,255

(22) PCT Filed: Nov. 27, 2012

(86) PCT No.: PCT/FR2012/052728
§ 371 (c)(1),
(2) Date: Jun. 13, 2014

(87) PCT Pub. No.: WO2013/088017
PCT Pub. Date: Jun. 20, 2013

(65) Prior Publication Data
US 2014/0315458 A1    Oct. 23, 2014

(30) Foreign Application Priority Data

Dec. 14, 2011  (FR) ...................................... 11 61626

(51) Int. Cl.
*C23C 16/00* (2006.01)
*C04B 41/45* (2006.01)
(Continued)

(52) U.S. Cl.
CPC .......... *C04B 41/4556* (2013.01); *B29B 15/08* (2013.01); *B29B 15/10* (2013.01);
(Continued)

(58) Field of Classification Search
CPC .......... C04B 41/4556; C04B 35/62873; C04B 35/62894; C04B 35/62897; C04B 35/806;
(Continued)

(56) References Cited

U.S. PATENT DOCUMENTS 4,292,345 A * 9/1981 Kolesnik ............... C04B 41/009
                                                              252/506
5,232,598 A * 8/1993 Thomas ............. B01D 67/0046
                                                              210/500.25

(Continued)

FOREIGN PATENT DOCUMENTS

DE      GB 2467928 A  *  8/2010  ............. C22C 47/04
EP         1013412 A1     6/2000
(Continued)

OTHER PUBLICATIONS

International Search Report for corresponding International PCT Application No. PCT/FR2012/052728, dated Apr. 18, 2013.

*Primary Examiner* — Michael Wieczorek
*Assistant Examiner* — Michael G Miller
(74) *Attorney, Agent, or Firm* — Workman Nydegger

(57) ABSTRACT

A method of treating silicon carbide fibers comprises phosphating heat treatment in a reactive gas so as to form a coating around each fiber for protection against oxidation. The coating comprises a surface layer of silicon pyrophosphate crystals and at least one underlying bilayer system comprising a layer of a phosphosilicate glass and a layer of microporous carbon.

12 Claims, 2 Drawing Sheets

(51) Int. Cl.
| | | |
|---|---|---|
| *C04B 35/565* | (2006.01) | |
| *C04B 35/628* | (2006.01) | |
| *C04B 35/80* | (2006.01) | |
| *B29B 15/10* | (2006.01) | |
| *D06M 11/68* | (2006.01) | |
| *B29B 15/08* | (2006.01) | |
| *B29B 11/16* | (2006.01) | |

(52) U.S. Cl.
CPC ...... *C04B 35/565* (2013.01); *C04B 35/62844* (2013.01); *C04B 35/62873* (2013.01); *C04B 35/62881* (2013.01); *C04B 35/62884* (2013.01); *C04B 35/62894* (2013.01); *C04B 35/62897* (2013.01); *C04B 35/806* (2013.01); *D06M 11/68* (2013.01); *B29B 11/16* (2013.01); C04B 2235/447 (2013.01); C04B 2235/5244 (2013.01); C04B 2235/614 (2013.01); C04B 2235/9684 (2013.01); Y10T 428/292 (2015.01); Y10T 442/2008 (2015.04)

(58) Field of Classification Search
CPC ............ C04B 35/565; C04B 35/62284; C04B 35/62844; C04B 35/62881; C04B 2235/9684; C04B 2235/614; C04B 2235/447; C04B 2235/5244; B29B 15/08; B29B 15/10; B29B 11/16; D06M 11/68; Y10T 442/2008; Y10T 428/292
USPC .......................................... 427/248.1–255.7
See application file for complete search history.

(56) References Cited

U.S. PATENT DOCUMENTS

| | | |
|---|---|---|
| 6,418,973 B1 | 7/2002 | Cox et al. |
| 6,461,415 B1 | 10/2002 | Sambasivan et al. |
| 9,117,817 B2 * | 8/2015 | Williams .............. H01L 29/513 |
| 2003/0138673 A1 | 7/2003 | Sambasivan et al. |
| 2004/0011245 A1 | 1/2004 | Sambasivan et al. |
| 2006/0134415 A1 | 6/2006 | Gogotsi et al. |
| 2009/0064893 A1 | 3/2009 | Sambasivan et al. |
| 2012/0020863 A1 | 1/2012 | Plaisantin et al. |

FOREIGN PATENT DOCUMENTS

| | | |
|---|---|---|
| GB | 2467928 A | 8/2010 |
| WO | 2002016263 A1 | 2/2002 |
| WO | 2005092610 A1 | 10/2005 |
| WO | 2010076475 A1 | 7/2010 |

* cited by examiner

METHOD OF TREATING CERAMIC FIBERS BY PHOSPHATING

BACKGROUND OF THE INVENTION

The present invention relates to silicon carbide (SiC) fibers used as reinforcement in the fabrication of composite materials, and more particularly thermostructural composite materials made of fiber reinforcement densified by a matrix.

Thermostructural composite materials are characterized by their mechanical properties that make them suitable for constituting structural parts, and by their capacity for conserving these mechanical properties at high temperatures. Nevertheless, ceramic fibers, such as silicon carbide (SiC) fibers, are sensitive to oxidation when they are exposed at high temperatures (e.g. in the range 300° C. to 1500° C.) to an oxidizing medium, in particular in the presence of air, or water vapor, and more generally in the presence of any gaseous or liquid phase containing oxygen or an oxygen compound.

The oxidation of SiC fibers has a direct impact on their lifetime, and consequently on the lifetime of the composite material for which they constitute the reinforcement.

Document WO 2010/076475 describes a method of treating ceramic fibers, which method comprises first heat treatment in a reactive gas performed using at least one first reactive gas of halogen type that acts by chemically transforming the surface of the fiber to form a surface layer constituted for the most part of carbon, and second heat treatment in a reactive gas performed with at least one second reactive gas that eliminates the surface layer formed on the surface during the chemical transformation. Using those two heat treatments with different and appropriate reactive gases makes it possible to totally eliminate the surface layer of the material of the fibers, which layer contains the defects that have the greatest influence on limiting the mechanical properties and the lifetime of the fibers. Nevertheless, that treatment method does not improve the ability of the fibers to withstand oxidation.

Heat treatment of ceramic fibers with a halogen gas is also used in Document WO 2005/092610 as an intermediate step in a method of making a boron aluminum nitrogen (BAN) type coating on ceramic fibers, the coating being constituted for example by a mixture of BN and of Al(O)N, for the purpose of improving the ability of ceramic composites to withstand oxidation.

Although ceramic fibers provided with such a coating present an improvement in their ability to withstand oxidation, that ability nevertheless remains insufficient, in particular in terms of increasing the lifetime of the fibers.

There thus exists a need to protect SiC fibers individually against oxidation.

OBJECT AND SUMMARY OF THE INVENTION

An object of the present invention is to remedy those drawbacks by proposing a surface treatment for silicon carbide fibers that makes it possible to increase the ability of each fiber individually to withstand an oxidizing atmosphere at high temperature, in particular in the range 300° C. to 1500° C.

This object is achieved by the fact that, in accordance with the invention, the silicon carbide fibers are subjected to phosphating heat treatment in a reactive gas so as to form a coating around each fiber for protection against oxidation, the coating comprising a surface layer of silicon pyrophosphate crystals and at least one underlying bilayer system comprising a layer of a phosphosilicate glass and a layer of microporous carbon.

The treatment of the invention makes it possible to form a single layer or multilayer system on the surface of each treated fiber that serves to prevent the underlying ceramic of the fiber from oxidizing. The resulting fiber has the same chemical nature as the initial fiber, but it possesses increased ability to withstanding oxidation, thereby significantly increasing its lifetime in an oxidizing atmosphere at high temperature, and consequently increasing the lifetime of the composite material of which it forms a part.

According to a particular characteristic of the invention, a layer of micro-mesoporous or microporous carbon is formed on the surface of each fiber before the phosphating heat treatment in a reactive gas.

Prior formation of a surface layer of micro-mesoporous or microporous carbon serves to homogenize the phosphating treatment and to obtain a protective coating that is more uniform.

A micro-mesoporous carbon layer may be formed by etching the surface of each fiber with a phosphorus-containing agent in a gas followed by treatment to eliminate the phosphosilicate glass and the silicon pyrophosphate formed during the etching with phosphoric acid vapor. The treatment for eliminating the phosphosilicate glass and the silicon pyrophosphate may be performed by etching the surface of the fibers with a basic compound. The micromesoporous or microporous carbon layer is interposed between the surface layer of silicon pyrophosphate crystals and the bilayer system(s) of phosphosilicate glass and microporous carbon.

In a variant, a layer of microporous carbon is formed by heat treatment in a reactive gas performed with at least one reactive gas of halogen type selected from at least chlorine gas, fluorine gas, and hydrogen chloride.

In a particular aspect of the invention, the protective coating against oxidation presents thickness lying in the range 50 nanometers (nm) to 1 micrometer (μm), and more preferably in the range 100 nm to 500 nm.

The phosphating heat treatment in a reactive gas and the other treatments, if any, are preferably performed at temperatures lower than the thermal stability temperature of the silicon carbide fibers.

The invention also provides a method of fabricating a fiber preform, the method comprising forming a fiber structure from silicon carbide fibers and being characterized in that the fibers are treated in accordance with the treatment method of the invention. The fibers may be treated before or after forming the fiber structure.

The invention also provides a method of fabricating a composite material part, the method comprising making a fiber preform in accordance with the method of the invention for fabricating a fiber preform, and densifying the preform.

Furthermore, the invention also provides a fiber structure comprising silicon carbide fibers and characterized in that each fiber includes over at least a fraction of its surface a protective coating against oxidation comprising a surface layer of silicon pyrophosphate crystals and at least one underlying bilayer system comprising a layer of a phosphosilicate glass and a layer of microporous carbon.

According to a particular characteristic of the invention, each silicon carbide fiber also includes on at least a fraction of its surface a layer of micro-mesoporous or microporous carbon, said layer of micro-mesoporous or microporous carbon being interposed between the surface layer of pyrophosphate crystals and said at least one bilayer system comprising a layer of a phosphosilicate glass and a layer of microporous carbon.

Finally, the invention provides a composite material part comprising fiber reinforcement constituted by a fiber structure of the invention.

BRIEF DESCRIPTION OF THE DRAWINGS

Other characteristics and advantages of the invention appear from the following description of particular implementations of the invention given as non-limiting examples and with reference to the accompanying drawings, in which.

DETAILED DESCRIPTION OF IMPLEMENTATIONS

Figure 1:
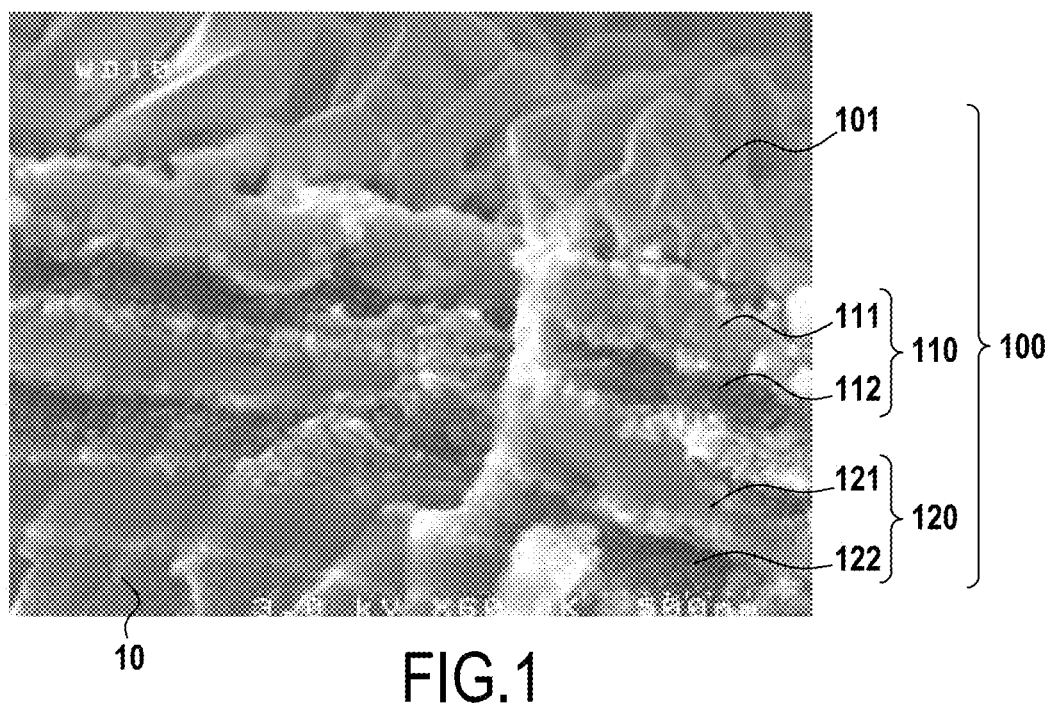
FIG. 1 is a microphotograph showing an SiC fiber provided with a protective coating against oxidation with multiple bilayer morphology obtained by phosphating in accordance with the method of the invention.

The method of the present invention proposes a solution for forming a single layer or multilayer protective coating against oxidation on the surface of silicon carbide (SiC) fibers. The method of the invention comprises treatment that consists in etching the surface of SiC fibers with a phosphorus compound in the gaseous state.

This treatment corresponds to phosphating heat treatment with a reactive gas that consists in putting the surface of the SiC fibers into contact with vapors of a phosphorus-containing agent, such as for example phosphoric acid ($H_3PO_4$) or indeed phosphorus pentoxide ($P_2O_5$) mixed with water vapor, thereby chemically transforming the ceramic material of the fiber at its surface so as to form a coating of different material that is constituted essentially by a surface layer of silicon pyrophosphate crystals ($SiP_2O_7$), together with one or more bilayer systems, each comprising a layer of phosphosilicate glass situated beside the surface layer of silicon pyrophosphate crystals and a layer of microporous carbon situated beside the fiber.

The reactive gas technique enables the fiber to be etched on the surface only, while preserving the remainder of the fiber. The phosphating treatment is preferably performed at a temperature higher than 580° C. in order to avoid reaction rates that are too slow, and lower than 850° C. in order to avoid oxidizing the carbon of the resulting protective coating and reducing the phosphorus-containing agent.

The fibers are treated in an enclosure having reactive gas inlets enabling the fibers to be swept with vapors of a phosphating agent, such as vapors of phosphoric acid, and at least one exhaust duct for removing the gaseous effluent given off during the chemical reactions. The heat treatment is performed at temperatures lower than the thermal stability temperature of the fibers so as to avoid thermal degradation of the fibers, which would be unacceptable for their mechanical properties. For example, for Si—C—O fibers, which are temperature stable up to about 1000° C., the heat treatment is performed at temperatures lower than 700° C.

Depending on the phosphating treatment conditions, the protective coating against oxidation may present single bilayer morphology, i.e. a protective coating comprising under the surface layer of silicon pyrophosphate crystals, a single bilayer system comprising a layer of a phosphosilicate glass and a layer of microporous carbon. The protective coating against oxidation may equally well present multiple bilayer morphology, i.e. a protective coating comprising, between the surface layer of silicon pyrophosphate crystals and the fiber, a plurality of bilayer systems, each comprising a layer of phosphosilicate glass and a layer of microporous carbon. Each system comprises approximately equal proportions of microporous carbon and of phosphosilicate glass. The single or multiple bilayer morphology of the coating is obtained as a function of the temperature, duration, and acid concentration conditions that apply during the phosphating treatment. More precisely, in order to obtain a coating with multiple bilayer morphology, phosphating treatment is performed at a temperature of about 650° C. for a few hours with a maximum concentration of acid, e.g. with phosphoric acid at a concentration of 14.6 moles per liter (mol/L). A coating having single bilayer morphology may be obtained with phosphating treatment performed at a temperature that is higher or lower than 650° C.

FIG. 1 shows an SiC fiber 10 covered in a protecting coating 100 of the invention that was obtained by direct phosphating treatment on raw SiC fiber of the Tyranno S type, the treatment being performed in an oven maintained at a temperature of 600° C. for 7 hours (h), and in which the gaseous phase of the phosphorus-containing agent was obtained with phosphoric acid at 14.6 mol/L, with an acid flow rate of $1.21 \times 10^{-6}$ liters per second (L/s), and with a nitrogen flow rate of $1.39 \times 10^{-3}$ L/s. With these treatment conditions, a protective coating 100 was obtained that presents multiple bilayer morphology, i.e. that in this example comprises a surface layer 101 of silicon pyrophosphate crystals and at least two bilayer systems 110 and 120, each comprising a phosphosilicate glass layer 111 or 121, and a microporous carbon layer 112 or 122.

Figure 2:
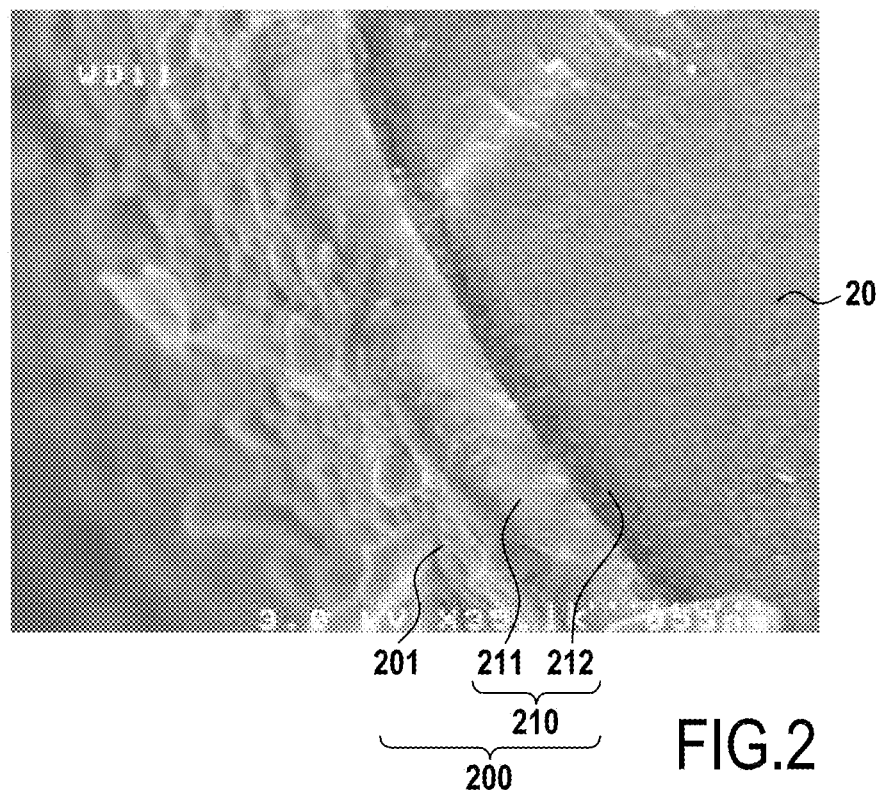
FIG. 2 is a microphotograph showing an SiC fiber provided with a protective coating against oxidation with single bilayer morphology obtained by phosphating in accordance with the method of the invention.

FIG. 2 shows an SiC fiber 20 covered in a protecting coating 200 of the invention that was obtained by direct phosphating treatment on raw SiC fiber of the Tyranno S type, the treatment being performed in an oven maintained at a temperature of 775° C. for 1 h, and in which the gaseous phase of the phosphorus-containing agent was obtained with phosphoric acid at 14.6 mol/L, with an acid flow rate of $1.21 \times 10^{-6}$ L/s, and with a nitrogen flow rate of $1.39 \times 10^{-3}$ L/s. With these treatment conditions, a protective coating 200 was obtained that presents single bilayer morphology, i.e. that in this example comprises a surface layer 201 of silicon pyrophosphate crystals and at a single bilayer system 210 comprising one phosphosilicate glass layer 211 and one carbon layer 212.

Furthermore, the thickness of the protective coating against oxidation formed by chemical transformation of the surface of the fiber can be adjusted by controlling one or more of the following conditions of the phosphating treatment: temperature, duration, and concentration of the phosphorus-containing agent. The thickness of the protective coating obtained lies in the range 50 nm to 1 μm, and more preferably in the range 100 nm to 500 nm.

In a variant implementation of the method of the invention, a microporous or micro-mesoporous carbon layer is formed on the surface of each fiber before forming the protective coating against oxidation.

In a first aspect of this variant, a layer of micro-mesoporous carbon is made by high temperature etching of the surface of each fiber with a phosphorus-containing agent in the gaseous phase (e.g. vaporized phosphoric acid) followed by treatment for eliminating the phosphosilicate glass and the silicon pyrophosphate that are formed during the etching. The operating conditions of such etching are the same as those described above for the phosphating treatment used for obtaining a single layer or multilayer coating.

The phosphosilicate glass and the silicon pyrophosphate may be eliminated by etching the surface of the fibers with a basic compound such as sodium hydroxide. These compounds are sensitive to hydrolysis in an alkaline solution by dissolving at a rate that depends naturally on the pH and on the temperature of the solution. By way of example, the phosphosilicate glass and the silicon phosphosilicate are eliminated by soaking the fibers in 1 molar (M) sodium hydroxide at 80° C. for 1 h, this operation being repeated three times with rinsing in distilled water and drying between each soaking operation.

The thickness of the micro-mesoporous carbon layer can be adjusted by controlling the temperature and/or the duration of the heat treatment under phosphorus-containing agent vapor.

Figure 3:
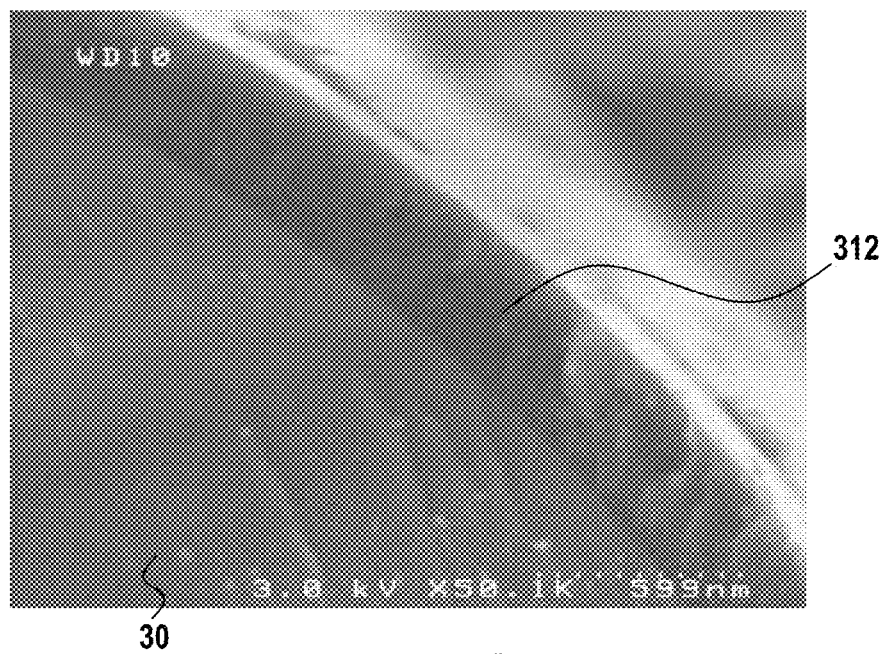
FIG. 3 is a microphotograph of the FIG. 2 fiber after the surface layer of silicon pyrophosphate crystals and the layer of a phosphosilicate glass of the protective coating have been eliminated by basic etching.

FIG. 3 shows an SiC fiber 30 obtained from the SiC fiber 20 of FIG. 2 after performing basic etching on the fiber in order to eliminate the surface layer 201 of silicon pyrophosphate crystals and in order to eliminate the phosphosilicate glass layer 211 of the bilayer system 210 so as to leave remaining on the fiber 30 only a micro-mesoporous carbon layer 312 obtained from the carbon layer 212.

After the basic etching, and as described above, the fibers are then subjected once more to phosphating heat treatment using a reactive gas in order to form the protective coating against oxidation. Under such circumstances, the layer of micro-mesoporous carbon acts as a membrane for species diffusion, the transformation of the fiber in contact with the phosphating gaseous species being obtained under the layer of micro-mesoporous carbon. Under such circumstances, the phosphosilicate glass and microporous carbon bilayer system(s) is/are formed under the previously-formed layer of micro-mesoporous carbon, while the layer of silicon pyrophosphate crystals is formed over the layer of micro-mesoporous carbon.

In a second aspect of the variant implementation of the method of the invention, a layer of microporous carbon is formed by chlorination, i.e. by heat treatment with a reactive gas performed using at least one halogen type reactive gas, consisting in putting the surface of the ceramic fiber into contact with a gas or a mixture of gases of the halogen type, such as chlorine gas ($Cl_2$) for example, thereby chemically transforming the ceramic material forming the surface of the fiber so as to form a surface layer of a different material that is constituted essentially by microporous carbon. The halogen compound present in the reactive gas extracts the silicon, and the oxygen if any, present in the material constituting the surface of the fiber, the extracted matter being in the form of gaseous effluent that is discharged. This leaves a surface layer of microporous carbon on the fiber.

In the same manner as for phosphating heat treatment with a reactive gas, the fibers are treated in an enclosure having inlets for reactive gases enabling the fibers to be swept with a gas or a mixture of gases of halogen type, and at least one exhaust duct for removing the gaseous effluent given off during the chemical reactions. The reactive gas or gases selected serve to perform heat treatments at temperatures that are lower than the thermal stability temperature of the fibers. When forming a microporous carbon layer by chlorinating with chlorine gas, the treatment temperature lies in the range 450° C. to 900° C.

The thickness of the microporous carbon layer that is formed by chemically transforming the surface of the fiber may be adjusted by controlling the temperature and/or the duration of the treatment relative to the reactivity of the gas or the mixture of gases of halogen type with the material of the fibers.

The halogen type reactive gas may be selected in particular from at least chlorine gas, fluorine gas, and hydrogen chloride.

After the microporous carbon layer has been formed by chlorination, the fibers are then subjected, as described above, to phosphating heat treatment with a reactive gas so as to form the protective coating against oxidation. Since the microporous carbon layer acts as a species diffusion membrane, the transformation of the fiber on contact with the phosphating gaseous species takes place under the microporous carbon layer, with the bilayer system(s) of phosphosilicate glass and of microporous carbon being formed under the previously formed layer of microporous carbon, while the layer of silicon pyrophosphate crystals is formed over the layer of microporous carbon.

Figure 4:
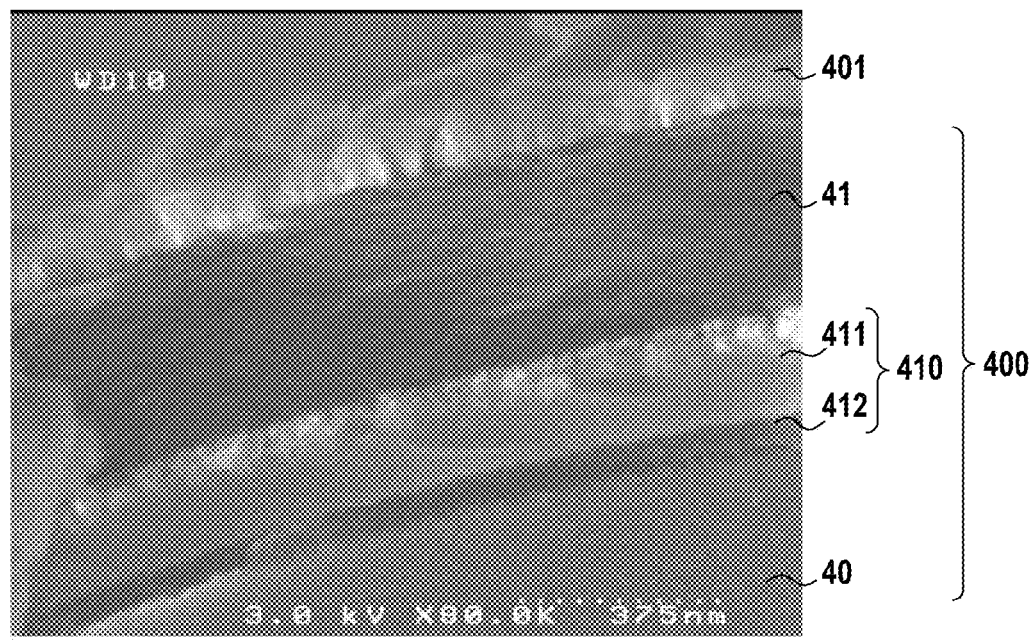
FIG. 4 is a microphotograph showing an SiC fiber provided with a protective coating against oxidation obtained by chlorinating and then phosphating the SiC fiber in accordance with the method of the invention.

FIG. 4 shows an SiC fiber 40 of Tyranno S type that has been subjected to heat treatment with a reactive gas performed with carbon gas vapor at 525° C. for a duration of 40 minutes (min) enabling a layer 41 of microporous carbon to be formed on the fiber. Thereafter, the fiber 40 was subjected to phosphating treatment performed in an oven maintained at a temperature of 700° C. for 3 h, and in which the gas phase of phosphorus-containing agent was obtained with phosphoric acid at 14.6 mol/L at an acid flow rate of $1.21 \times 10^{-6}$ L/s and a nitrogen flow rate of $4.3 \times 10^{-3}$ L/s. After the phosphating treatment, the fiber 40 had a protective coating 400 presenting single bilayer morphology made up of a surface layer 401 of silicon pyrophosphate crystals present over the layer 41 of microporous carbon and a bilayer system 410 comprising a layer 411 of phosphosilicate glass and a layer 412 of microporous carbon arranged between the fiber 40 and the layer 41 of microporous carbon.

The SiC fibers may be treated in the form of any fiber structure such as for example: yarns, tufts, twisted strands, tows, woven fabrics, felts, mats, and even two- or three-dimensional preforms.

The SiC fibers treated by the method of the invention may advantageously be used for making fiber preforms for composite material parts.

The fabrication of parts made of composite material reinforced by ceramic materials is well known. It generally comprises making a ceramic fiber preform of shape that is close to the shape of the part that is to be fabricated, and densifying the preform with a matrix.

The fiber preform constitutes the fiber reinforcement of the part, and it has a role that is essential for the mechanical properties of the part. The preform is obtained from fiber textures or structures made of ceramic fibers that may be in the form of yarns, tows, braids, woven fabrics, felts, etc. Shaping is performed by winding, weaving, stacking, and possibly needling two-dimensional plies of fabric or sheets of tows.

The SiC fibers of the fiber preform are treated in accordance with the method of the invention. The fibers may be treated after making the preform or beforehand (i.e. each fiber texture used for making the preform is treated before making the preform).

The fiber preform may be densified using a liquid technique (impregnation with a matrix precursor resin and transformation by curing and pyrolysis, which process may be repeated) or by using a gaseous technique (chemical vapor infiltration (CVI) of the matrix), or indeed by a combination of liquid and gaseous techniques.

The invention applies in particular to making parts out of ceramic matrix composite (CMC) material made up of SiC fiber reinforcement densified with a ceramic matrix, in particular a matrix of carbide, nitride, refractory oxide, etc. Typical examples of such ceramic fiber CMC materials are SiC—SiC materials (reinforcement made of silicon carbide fibers and matrix made of silicon carbide).

Comparative tests have been performed between SiC fibers that have been subjected to the phosphating treatment of the invention and the same SiC fibers that have not been subjected to such treatment.

The tables below show the improvements obtained in terms of lifetime (under stress at 650° C.) and in terms of ability to withstand oxidation (under an oxidizing atmosphere at 650° C.) for various types of SiC fiber that have been subjected to two categories of treatment of the invention. Table I shows the results for a first category of treatment corresponding to direct phosphating treatment on raw SiC fibers performed in an oven maintained at a temperature lying in the range 580° C. to 700° C. for 1 h to 4 h and in which the gas phase of the phosphorus-containing agent was obtained with phosphoric acid at 14.8 mol/L with an acid flow rate of $1.21 \times 10^{-6}$ L/s and a nitrogen flow rate lying in the range $4.17 \times 10^{-3}$ L/s to $7.5 \times 10^{-3}$ L/s. Table II shows the results for a second category of treatment comprising prior chlorination treatment of the SiC fibers performed using pure gaseous chlorine at a rate lying in the range $4.2 \times 10^{-3}$ L/s to $1.7 \times 10^{-2}$ L/s so as to form a layer micro-mesoporous carbon, followed by phosphating treatment performed under the same conditions as in the first category.

TABLE I

| Type of SiC fiber | Improvement in ability to withstand oxidation | Improvement in lifetime |
| --- | --- | --- |
| Nicalon | 3.4 | not tested |
| Tyranno S | 5.3 | 8 |
| Tyranno Lox-M | 3.55 | not tested |

TABLE II

| Type of SiC fiber | Improvement in ability to withstand oxidation | Improvement in lifetime |
| --- | --- | --- |
| Nicalon | 2.8 | 10,000 |
| Tyranno S | 20 | 10 |
| Tyranno Lox-M | 2.95 | 20-300 |

The invention claimed is:

1. A method of treating silicon carbide fibers, the method comprising phosphating heat treatment in a reactive gas so as to form a coating around each fiber for protection against oxidation, the coating comprising a surface layer of silicon pyrophosphate crystals and at least one underlying bilayer system comprising a layer of a phosphosilicate glass and a layer of microporous carbon.

2. A method according to claim 1, wherein before the phosphating heat treatment in a reactive gas, a micro-mesoporous or microporous carbon layer is formed on the surface of each fiber, and after the phosphating heat treatment said micro-mesoporous or microporous carbon layer is interposed between the surface layer of silicon pyrophosphate crystals and said at least one bilayer system comprising a layer of a phosphosilicate glass and a layer of microporous carbon.

3. A method according to claim 2, wherein the micro-mesoporous carbon layer is formed by etching the surface of each fiber with a phosphorus-containing agent in a gas followed by treatment to eliminate the phosphosilicate glass and the silicon pyrophosphate formed during the etching with the phosphorus-containing agent in a gas.

4. A method according to claim 3, wherein the treatment for eliminating the phosphosilicate glass and the silicon pyrophosphate is performed by etching the surface of the fibers with a basic compound.

5. A method according to claim 2, wherein the microporous carbon layer formed before phosphating heat treatment is formed by heat treatment in a reactive gas performed with at least one reactive gas comprising a halogen atom.

6. A method according to claim 5, wherein the reactive gas comprising a halogen atom further comprises chlorine gas, fluorine gas, or hydrogen chloride.

7. A method according to claim 1, wherein the protective coating against oxidation presents thickness lying in the range 50 nm to 1 μm.

8. A method according to claim 1, wherein the phosphating heat treatment in a reactive gas is performed at temperatures lower than the thermal stability temperature of silicon carbide fibers.

9. A method of fabricating a fiber preform comprising forming a fiber structure at least from silicon carbide fibers, wherein the fibers are treated in accordance with the treatment method of claim 1.

10. A method according to claim 9, wherein the fibers are treated before forming the fiber structure.

11. A method according to claim 9, wherein the fibers are treated after forming the fiber structure.

12. A method of fabricating a composite material part comprising making a fiber preform according to the method of claim 9, and densifying said preform.

* * * * *